US008266191B1

(12) United States Patent
Aggarwal et al.

(10) Patent No.: US 8,266,191 B1
(45) Date of Patent: *Sep. 11, 2012

(54) SYSTEM AND METHOD FOR FLEXIBLE SPACE RESERVATIONS IN A FILE SYSTEM SUPPORTING PERSISTENT CONSISTENCY POINT IMAGE

(75) Inventors: Himanshu Aggarwal, Cary, NC (US); Eric Hamilton, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/123,833

(22) Filed: May 20, 2008

Related U.S. Application Data

(63) Continuation of application No. 10/991,225, filed on Nov. 17, 2004, now Pat. No. 7,636,744.

(51) Int. Cl.
*G06F 17/30* (2006.01)
*G06F 12/00* (2006.01)

(52) U.S. Cl. ........................................ 707/820; 711/171

(58) Field of Classification Search .......... 707/600–831, 707/999.205; 711/156, 161, 162, 170, 171, 711/202
See application file for complete search history.

(56) References Cited

U.S. PATENT DOCUMENTS

| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,426,747 A | 6/1995 | Weinreb et al. |
| 5,581,724 A | 12/1996 | Belsan et al. |

(Continued)

FOREIGN PATENT DOCUMENTS
WO    WO 89/10594    11/1989

OTHER PUBLICATIONS

McKusick, Marshall Kirk, et al., A Fast File System for UNIX, Computer Science Division, Department of Electrical Engineering and Computer Sciences, Univ. of CA, Berkley, Feb. 18, 1994. 14(pages).*

(Continued)

*Primary Examiner* — Jean B Fleurantin
(74) *Attorney, Agent, or Firm* — Cesari and Mckenna, LLP

(57) ABSTRACT

The present invention provides a system and method for flexible space reservations in a file system. An administrator of a storage system selects a fractional reserve percentage, which defines the size of the overwrite reserve that is to be maintained to ensure file writeability.

20 Claims, 12 Drawing Sheets

U.S. PATENT DOCUMENTS

| | | | |
|---|---|---|---|
| 5,819,292 | A | 10/1998 | Hitz et al. |
| 6,636,879 | B1 | 10/2003 | Doucette et al. |
| 7,107,385 | B2 | 9/2006 | Rajan et al. |
| 7,111,021 | B1* | 9/2006 | Lewis et al. .................. 707/649 |
| 7,577,692 | B1* | 8/2009 | Corbett et al. ........................ 1/1 |
| 7,693,864 | B1* | 4/2010 | Pasupathy et al. ..... 707/999.102 |
| 2002/0016827 | A1* | 2/2002 | McCabe et al. ............... 709/213 |
| 2004/0139128 | A1* | 7/2004 | Becker et al. ................. 707/204 |
| 2005/0267916 | A1* | 12/2005 | Tone et al. .................... 707/200 |

OTHER PUBLICATIONS

Patterson et al., A Case for Redundant Arrays of Inexpensive Disks (RAID), 1988, ACM, 109-116.*

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached Worm File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, Feb. 1999 pp. 20-27.

Coyne, Robert A., et al., Storage Systems for National Information Assets, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 10/991,225, filed Nov. 17, 2004, by Himanshu Aggarwal et al. for a System and Method for Flexible Space Reservations in a File System Supporting Persistent Consistency Point Image, all pages.

Satyanarayanan et al., Efficient execution of read-only transactions in replicated multiversion databases, Oct. 1993, IEEE, vol. 5, 859-871.

Hartman et al., The Swarm scalable storage system, May 31-Jun. 4, 1999, IEEE, 74-81.

\* cited by examiner

US 8,266,191 B1

SYSTEM AND METHOD FOR FLEXIBLE SPACE RESERVATIONS IN A FILE SYSTEM SUPPORTING PERSISTENT CONSISTENCY POINT IMAGE

RELATED APPLICATIONS

This application is a continuation of U.S. Ser. No. 10/991,225, filed by Himanshu Aggarwal et al. on Nov. 17, 2004, titled SYSTEM AND METHOD FOR FLEXIBLE SPACE RESERVATIONS IN A FILE SYSTEM SUPPORTING PERSISTENT CONSISTENCY POINT IMAGES, now issued as U.S. Pat. No. 7,636,744 on Dec. 22, 2009.

FIELD OF THE INVENTION

The present invention relates to storage systems and, in particular, to reserving space on a storage system to ensure that files may be overwritten in a file system supporting persistent consistency point images.

BACKGROUND OF THE INVENTION

A storage system is a computer that provides storage service relating to the organization of information on writable persistent storage devices, such as memories, tapes or disks. The storage system is commonly deployed within a storage area network (SAN) is or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporal or permanent basis.

The file server, or storage system, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Some known file systems, including the Write Anywhere File Layout (WAFL™) is file system, by Network Appliance, Inc., of Sunnyvale, Calif., contain the capability to generate a snapshot of the file system. In the example of a WAFL-based file system, snapshots are described in TR3002 *File System Design for a NFS File Server Appliance* by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably throughout this patent without derogation of Network Appliance's trademark rights.

In the example of a WAFL-based file system, a file is represented as an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes a xinode field 130 containing a pointer 140 that references another on-disk inode structure containing, e.g., access control list (ACL) information associated with the file or directory. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing, e.g., 4 kilobyte (KB) data block on disk used to store the user data. Each pointer is preferably a logical volume block number which thereby facilitates efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 kilobyte data block on disk.

A PCPI is a restorable version of a file system created at a predetermined point in time and stored on the same storage devices that store the file system. PCPIs are generally created on some regular user-defined schedule. The PCPI is stored on-disk along with the active file system, and is called into a buffer cache of the storage system memory as requested by the storage operating system. An exemplary file system mode structure 200 is shown in FIG. 2. The mode for an mode file 205 contains information describing the inode file associated with a given file system. In this exemplary file system inode structure the inode for the inode file 205 contains a pointer to an inode file indirect block 210. The inode file indirect block 210 contains a set of pointers to inode blocks 215, each typically containing multiple inodes 217, which in turn contain pointers to indirect blocks 219. The indirect blocks 219 include pointers to file data blocks 220A, 220B and 220C. As noted, each of the file data blocks 220(A-C) is capable of storing, in the illustrative embodiment, 4 kilobytes (KB) of data.

When the file system generates a PCPI of a given file system, a PCPI (snapshot) inode is generated as shown in FIG. 3. The PCPI inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the PCPI inode 305 contains a pointer to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until they are released from all PCPIs. Thus, while the active file system inode for the inode file 405 points to new blocks 220A, 220B and 220C', the old blocks 210, 217, 219 and 220C are retained until the PCPI is fully released.

After a PCPI has been created and file data blocks modified, the file system layer can reconstruct or "restore" the file system inode structure as it existed at the time of the PCPI by accessing the PCPI inode. That is, by following the pointers contained in the PCPI inode 305 through the inode file indirect block 210, inode 217 and indirect block 219 to the unmodified file data blocks 220A-C, the file system layer can reconstruct the file system as it existed at the time of creation of the PCPI.

Storage systems may export virtual disks (vdisks) to clients utilizing block-based protocols, such as, for example, Fibre Channel and iSCSI. As used herein, a vdisk is a special file type in a volume that derives from a plain file, but that has associated export controls and operation restrictions that support emulation of a disk. Vdisks are described further in U.S. patent application Ser. No. 10/216,453, entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 12, 2006, the contents of which are hereby incorporated by reference. The exported (file) vdisks appear as physical disk devices to the clients of the storage system. Disk devices typically do not return a "no space" error hereinafter referred to as an OUT-OFSPACE error, when a write operation issued by a client (application), is directed to storage space that is known to exist. It should be noted, as one skilled in the art would recognize, that the exact error returned is protocol specific. As such, the term OUTOFSPACE error should be taken to mean generally a protocol specific out-of-space error. In other words, a disk device will not return an OUTOFSPACE error when a previously written block on disk is rewritten because successful completion of the primary outer block establishes to the application that data storage for the block exists. The application thus depends (relies) on the continued existence of such storage, and does not expect to receive an error when subsequently issuing write operations to this storage space. If the disk device does return an OUTOFSPACE error, the clients, will typically fail or assume an error condition that may lead to loss of data integrity and/or data loss. This noted problem may be further generalized to other types of files. For example, a database management system assumes that once it has written successfully to an area of a file it may continue to re-write to that area of the file without receiving an OUTOFSPACE error.

However, when using a file system that supports PCPIs, it is possible to exhaust the available disk storage space due to re-writing data that is stored both in the active file is system and in a PCPI. It should be noted that other file system architectures, including those with differing techniques for generating PCPIs, may also suffer from overcommitting storage space by permitting blocks of data and/or metadata to be shared among PCPIs and the active file system. As such, the teachings of the present invention may be utilized in any file system supporting PCPIs. The PCPI mechanism and file system described herein should be taken as exemplary only. For example, a file of size X bytes exists in a file system supporting space reservations. Immediately after a PCPI is taken of the file, the total storage space consumed by the file is X plus the added space required by the PCPI root inode. As blocks are modified in the PCPI file, the amount of storage space consumed by the file and its associated PCPI may approach 2× bytes. That is, as the version of the file in the active file system diverges from the version stored in the PCPI, the amount of space occupied by the file approaches 2×. If the available free space on disk is less than 2×, it is possible that a client attempting to re-write a portion of a file may receive an OUTOFSPACE error.

Additionally, certain file systems, including the above-described WAFL file system, include the ability to generate sparse files. By "sparse file" it is meant a file that is created with a predetermined size, but where not all of the physical blocks associated with the file are written and/or allocated at the time of file creation. Using backup operations, the sparse file may be created and "slowly" written to in the "background" (e.g., using conventional "lazy write" operations) to thereby reduce the need for massive data transfer between storage devices. Here, the created file consists basically of holes, i.e., predefined markers in the buffer tree structure that identify that the data is to be obtained from a backing store, that need to be filled. For example, in the WAFL-based file system, the root inode and associate intermediate inodes may exist at the time of file creation, but the file data blocks may not be initially allocated. As data is written to the sparse file, file data blocks are then allocated as needed. Yet, as data is written to the sparse file, it is possible that the amount of free space in the file system may be expanded, results in an OUT-OFSPACE error. As clients are typically not programmed to is deal with these errors, data loss and/or a loss of data integrity may occur.

Certain file systems employ space reservation techniques to guarantee file writeability when using PCPIs. An example is described in U.S. patent application Ser. No. 10/423,391, entitled SYSTEM AND METHOD FOR PRESERVING SPACE TO GUARANTEE FILE WRITEABILITY IN A FILE SYSTEM SUPPORTING PERSISTENT CONSISTENCY POINT IMAGES, by Peter F. Corbett, et al., now issued as U.S. Pat. No. 7,577,692 on Aug. 18, 2009. However, a noted problem of conventional space reservation techniques is that they require twice the amount of space of the active file system to be available whenever a PCPI is generated. Such techniques operate under the assumption that a file system stored in a PCPI will be completely overwritten before a next PCPI is taken, thereby requiring the amount of free storage space be equal to the amount or size of the active file system. For example, if 1000 MB of space is available in a file system and 501 MB are utilized, the remaining 499 MB will be reserved to generate a PCPI. Yet, since the full amount of space used active file system is not available, the storage system (i.e., 501 MB) will not permit the generation of a PCPI. This results in wasting of substantial (e.g., 499 MB) available data storage.

SUMMARY OF THE INVENTION

The disadvantages of the prior art are overcome by providing a system and method for reserving space to guarantee file writeability in a file system supporting PCPIs. According to the invention, an administrator is permitted to set a fractional reserve percentage for an overwrite block reserve, is the theoretical amount of space required to completely overwrite each block stored in a PCPI, i.e. to have complete divergence between the active file system and a PCPI. A fractional reserve percentage value is set depending on the average rate of change of data in a given volume, thereby enabling the administrator to utilize the inherently space efficient PCPIs without requiring reservation of twice the amount of storage actually used by the file system. In the illustrative embodiment, the administrator may configure the fractional reserve percentage value for each volume that is space reserved. The fractional reserve percentage value indicates the is percentage of the overwrite block reserve that is reserved for overwriting PCPIs. The invention further provides a series of space accounting mechanisms, including the novel fractional reserve percentage value, to account for various contingencies, including the expected divergence of a file in the active system from a copy stored in a PCPI.

During normal storage system operations, the file system receives a write operation from a client. In response, the storage system first determines if the write operation is directed to a space reserved file, i.e., a file that has space reservation set. A space reserved file may be, e.g., a sparse file. If the write operation is directed to a space reserved file, the file system determines if the space needed for the write operation is less then the space available in the file system. If so, the write operation is permitted; however, if the space available is not sufficient for the write operation, the write operation fails. Moreover, if the write operation is not directed to a reserved file, the file system determines if the space required for the write operation is less then the space available minus the fractional reserve percentage multiplied by the overwrite reserve. If so, the file system processes the write operation.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Storage Appliance

The present invention may be implemented, in the illustrative embodiment, on a storage appliance that serves both file and block protocol access to information stored on storage devices in an integrated manner. In this context, the integrated appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 5:
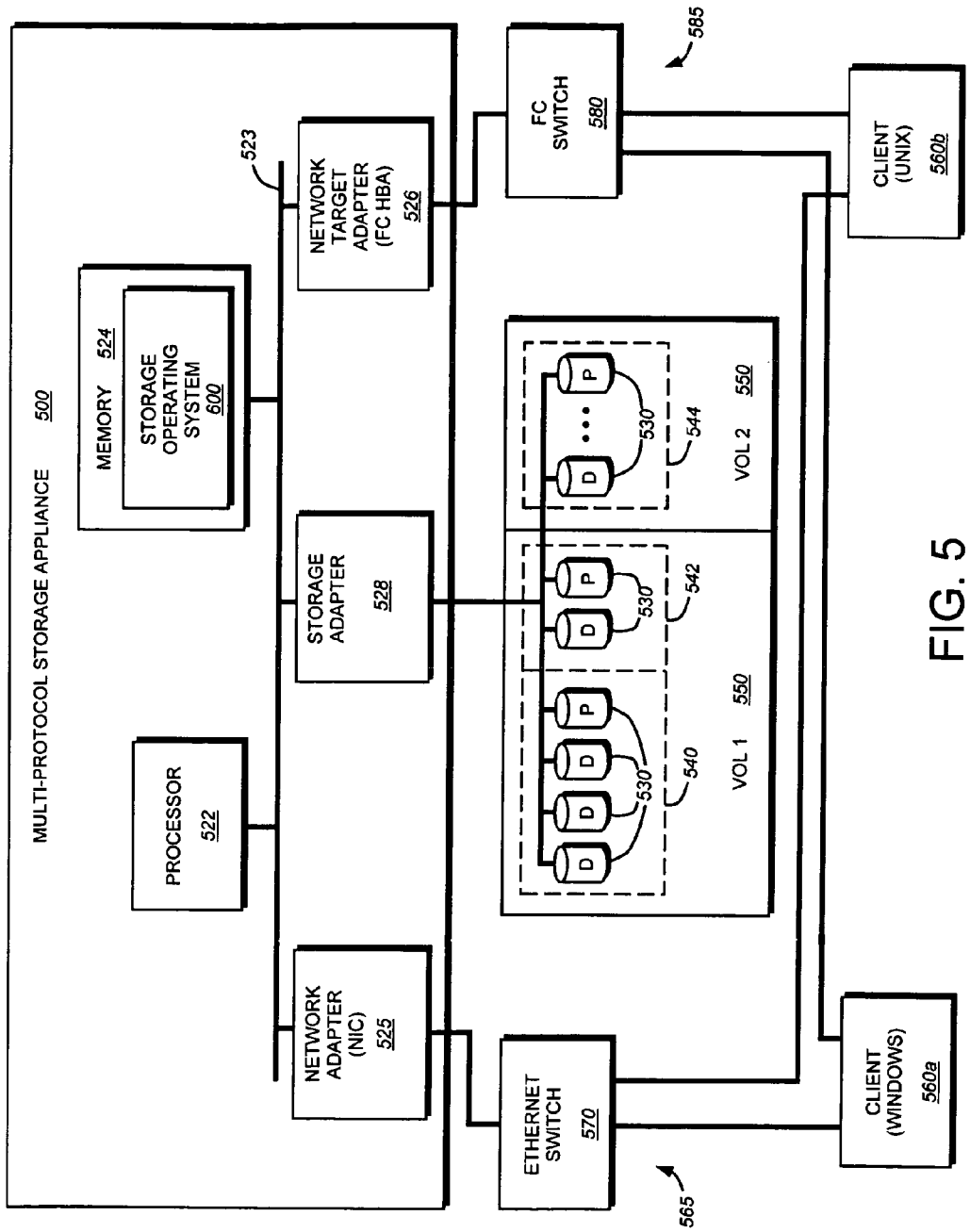
FIG. 5 is a schematic block diagram of an exemplary storage system in accordance with an embodiment of the present invention.

FIG. 5 is a schematic block diagram of the storage appliance 500 configured to is provide storage service relating to the organization of information on storage devices, such as disks 530. The storage appliance 500 is illustratively embodied as a storage system comprising a processor 522, a memory 524, a plurality of network adapters 525, 526 and a storage adapter 528 interconnected by a system bus 523. The multi-protocol storage appliance 500 also includes a storage operating system 600 that provides a virtualization system (and, in particular, a file system) to logically organize the information as a hierarchical structure of named directory, file and virtual disk (vdisk) storage objects on the disks 530.

Whereas clients of a NAS-based network environment have a storage viewpoint of files, the clients of a SAN-based network environment have a storage viewpoint of blocks or disks. To that end, the multi-protocol storage appliance 500 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 525 couples the storage appliance to a plurality of clients 560*a,b* over point-to-point links, wide area networks, virtual private networks implemented over a public network (Internet) or a shared local area network, hereinafter referred to as an illustrative Ethernet network 565. Therefore, the network adapter 525 may comprise a network interface card (NIC) having the mechanical, electrical and signaling circuitry needed to connect the appliance to a network switch, such as a conventional Ethernet switch 570. For this NAS-based network environment, the clients are configured to access information stored on the multi-protocol appliance as files. The clients 560 communicate with the storage appliance over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 560 may request the services of the storage appliance 500 by issuing file access protocol messages (in the form of packets) to the appliance over the network 565. For example, a client 560*a* running the Windows operating system may communicate with the storage appliance 500 using the Common Internet File System (CIFS) protocol over TCP/IP. On the other hand, a client 560*b* running the UNIX operating system may communicate with the multi-protocol appliance using either the Network File System (NFS) protocol over TCP/IP or the Direct Access File System (DAFS) protocol over a Virtual Interface (VI) transport in accordance with a remote direct memory access (RDMA) protocol over TCP/IP. It will be apparent to those skilled in the art that other clients running other types of operating systems may also communicate with the integrated multi-protocol storage appliance using other file access protocols.

The storage network "target" adapter 526 also couples the multi-protocol storage appliance 500 to clients 560 that may be further configured to access the stored information as blocks or disks. For this SAN-based network environment, the storage appliance is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the appliance 100 to a SAN network switch, such as a conventional FC switch 580. In addition to providing FC access, the FC HBA may offload Fibre Channel network processing operations for the storage appliance.

The clients 560 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 530, to attach to the storage appliance 500. In SCSI terminology, clients 560 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage appliance 500) by issuing iSCSI and FCP messages over the network 565, 585 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 528 cooperates with the storage operating system 600 executing on the storage appliance to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the appliance 500 is preferably implemented as one or more storage volumes (e.g., VOL1-2 550) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 530, the storage operating system 600 implements a write-anywhere file system of a virtualization system that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in U.S. patent application Ser. No. 10/216,453 entitled STORAGE VIRTUALIZATION BY LAYERING VIRTUAL DISK OBJECTS ON A FILE SYSTEM, by Vijayan Rajan et al., now issued as U.S. Pat. No. 7,107,385 on Sep. 12, 2006, which application is hereby incorporated by reference as though fully set forth herein.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
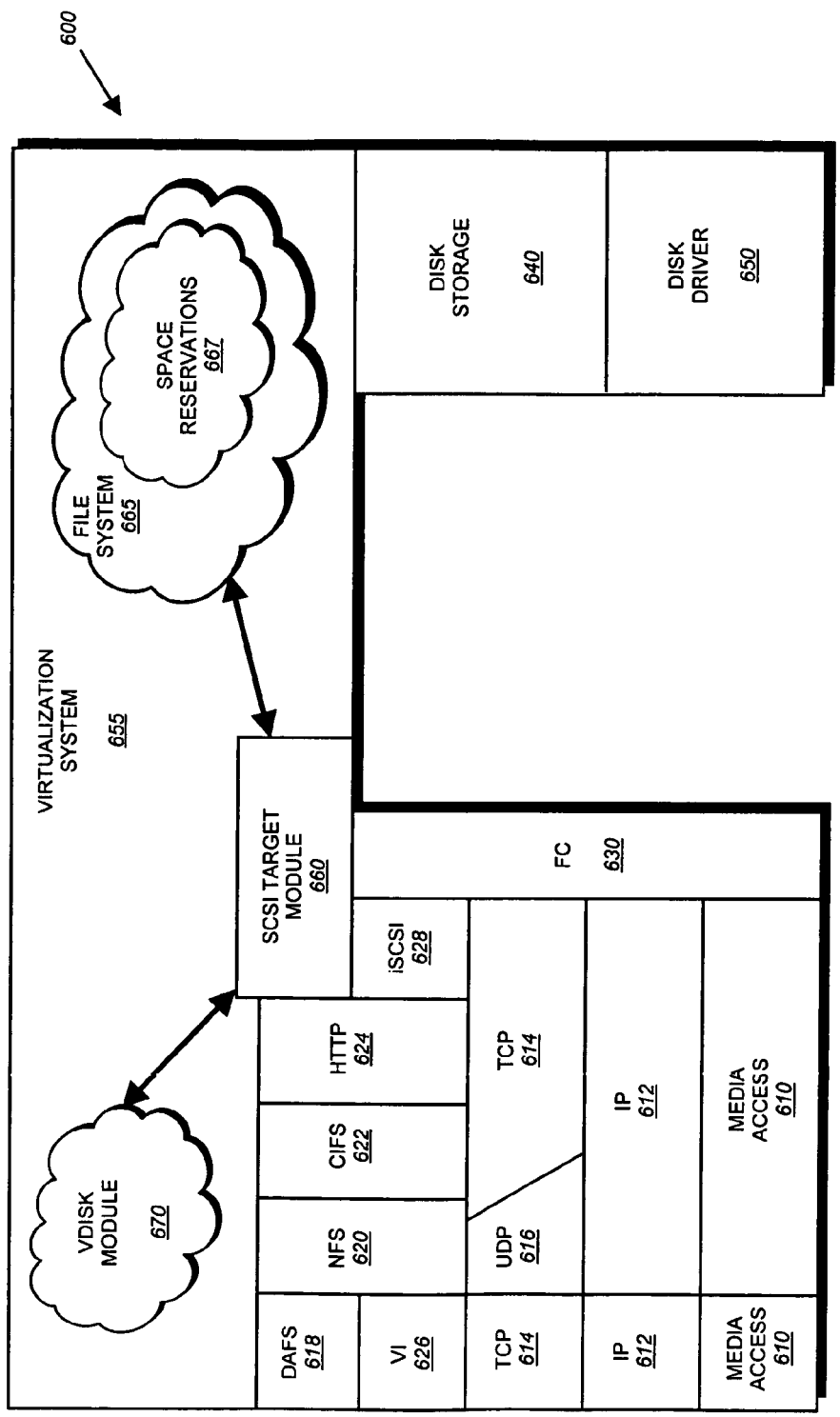
FIG. 6 is a schematic block diagram of an exemplary storage operating system for use with the storage system of FIG. 5 in accordance with an embodiment of the present invention.

FIG. 6 is a schematic block diagram of an exemplary storage operating system 600 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A Virtual Interface (VI) layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 cooperating with virtualization modules illustratively embodied as, e.g., vdisk module 670 and SCSI target module 660. It should be noted that the vdisk module 670, file system 665 and SCSI target module 660 can be implemented in software, hardware, firmware, or a combination thereof. The vdisk module 670 is layered on (and interacts with) the file system 665 to provide a data path from the block-based SCSI target module to blocks managed by the file system. In essence, the vdisk module 670 manages SAN deployments by, among other things, implementing a comprehensive set of vdisk (lun) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 628, 630 and the file system 665 to thereby provide a translation layer of the virtualization system 655 between the SAN block (lun) space and the file system space, where luns are represented as vdisks.

The file system 665 illustratively implements the above-described WAFL file system having an on-disk format representation that is block-based using, e.g., 4 kilobyte (kB) blocks and using inodes to describe the files. Included with the file system 665 is a space reservation process 667 that, in the illustrative embodiment, implements the space reservation policies of the present invention, as described further below.

Broadly stated, all inodes of the file system are organized into the inode file. A file system (fs) info block specifies the layout of information in the file system and includes an inode of a file that includes all other inodes of the file system. Each volume has an fs info block that is preferably stored at a fixed location within, e.g., a RAID group of the file system. The inode of the root fs info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the multi-protocol storage appliance may alternatively be implemented in hardware. That is, in an alternate embodiment of the invention, a storage access request data path through the operating system layers (including the virtualization system 655) may be implemented as logic circuitry embodied within a field programmable gate array (FPGA) or an application specific integrated circuit (ASIC). This type of hardware implementation increases the performance of the storage service provided by appliance 500 in response to a file access or block access request issued by a client 560. Moreover, in another alternate embodiment of the invention, the processing elements of network and storage adapters 525-528 may be configured to offload some or all of the packet processing and storage access operations, respectively, from processor 522 to thereby increase the performance of the storage service provided by the multi-protocol storage appliance. It is expressly contemplated that the various processes, architectures and procedures described herein can be implemented in hardware, firmware or software.

C. Sparse Files

The exemplary WAFL file system includes the capability to generate a sparse file, wherein the contents of the file are not completely written to disk at the time of creation. In other words, storage space required for the sparse file has not yet been allocated to it. A sparse file that is often utilized in the exemplary WAFL file system environment when, for example, a vdisk is initially generated by a user or administrator of specified size, for example, 100 gigabytes (GB). To increase system performance, the file system does not write the entire vdisk to physical disk at the time of creation. Instead, the file system generates a sparse file representing the vdisk. The sparse file may then be "filled" in via later write operations as the vdisk is populated with data.

Figure 7:
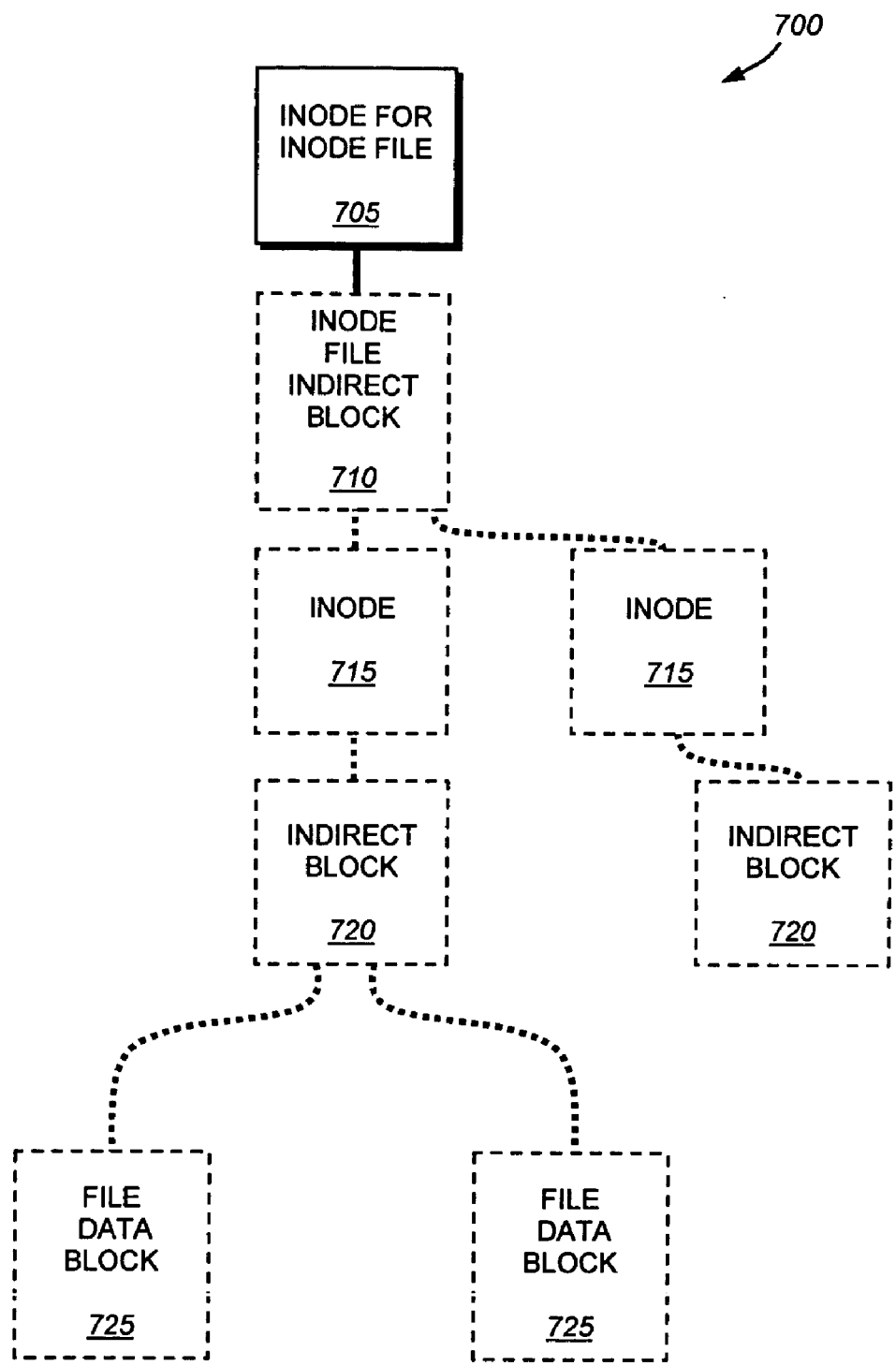
FIG. 7 is a schematic block diagram of an exemplary sparse file showing a completed inode for the inode file.

FIG. 7 is a schematic block diagram of an exemplary inode structure 700 showing a sparse file. The sparse file includes an actual inode for the inode file 705, however, it does not contain an inode file indirect block 710, inode 715, indirect block 720 or file data block 725 (as shown in phantom). This exemplary inode structure 700 is created when, for example, a vdisk is initially created by the file system 665. In typical file systems that implement sparse files, only the inode for the inode file 705 is actually written to the disk. Thus, the only physical space occupied by the file is the block containing the inode for the inode file 705. The remainder of the vdisk contents are not written or otherwise physically delineated on the disks storing the vdisk. Thus, the phantom blocks (i.e., 710, 715, 720 and 725) are not generated when the file is created; however, they will need to be written to disk as the sparse file is populated.

Figure 8:
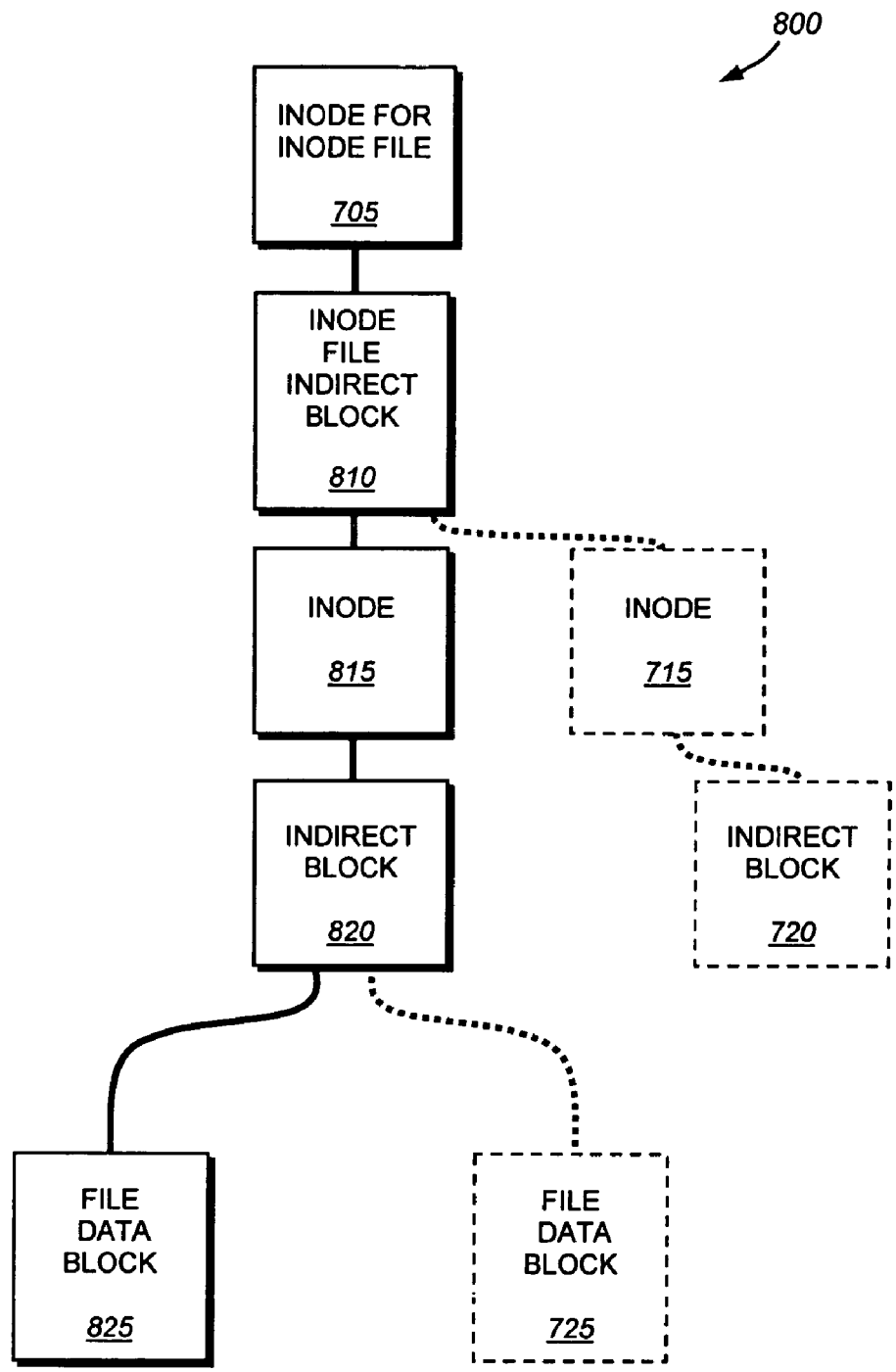
FIG. 8 is a schematic block diagram of a partially filled in sparse file in accordance with an embodiment of the invention.
Figure 9:
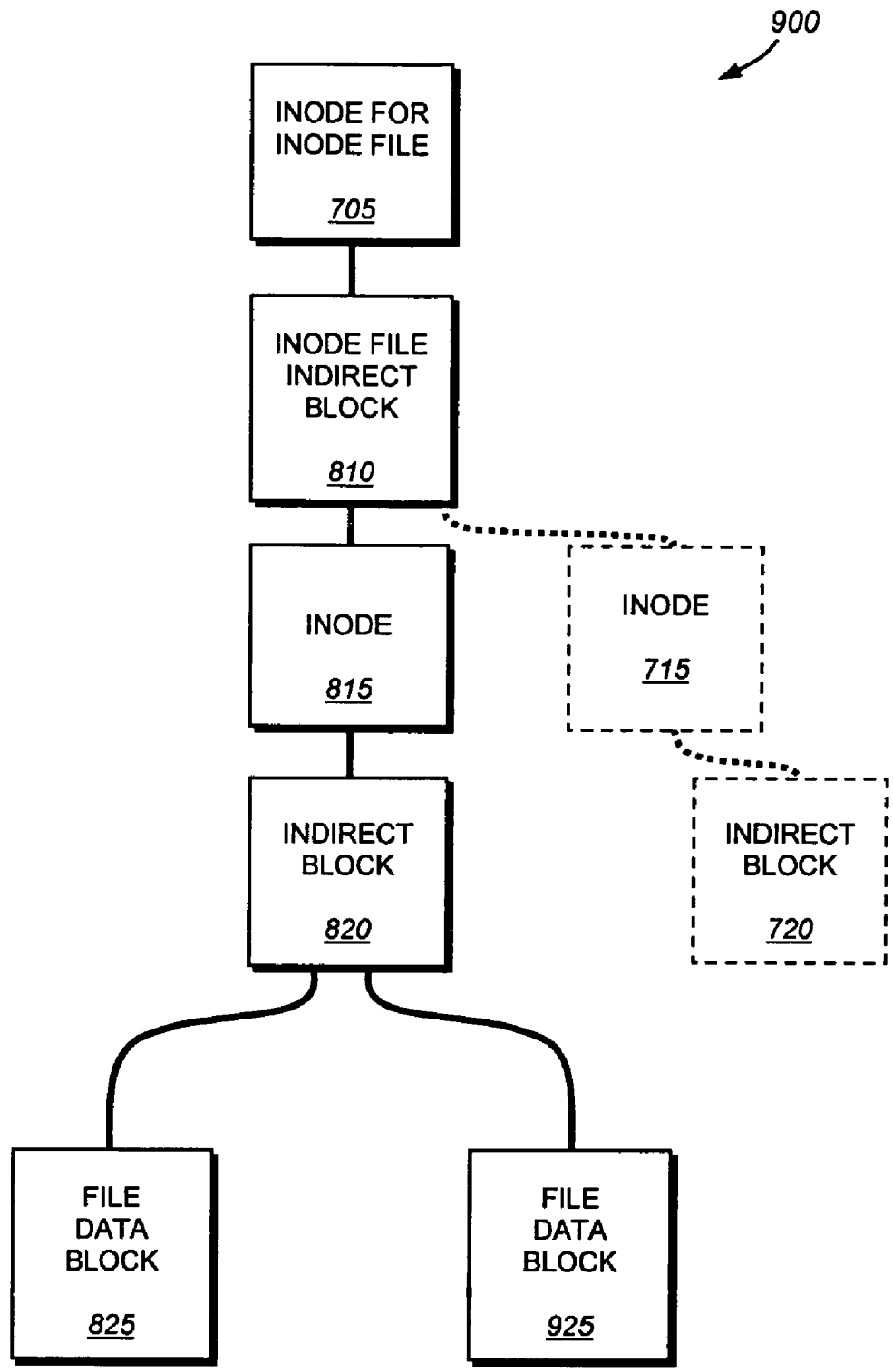
FIG. 9 is a schematic block diagram of a partially filled in sparse file in accordance with an embodiment of the invention.
Figure 10:
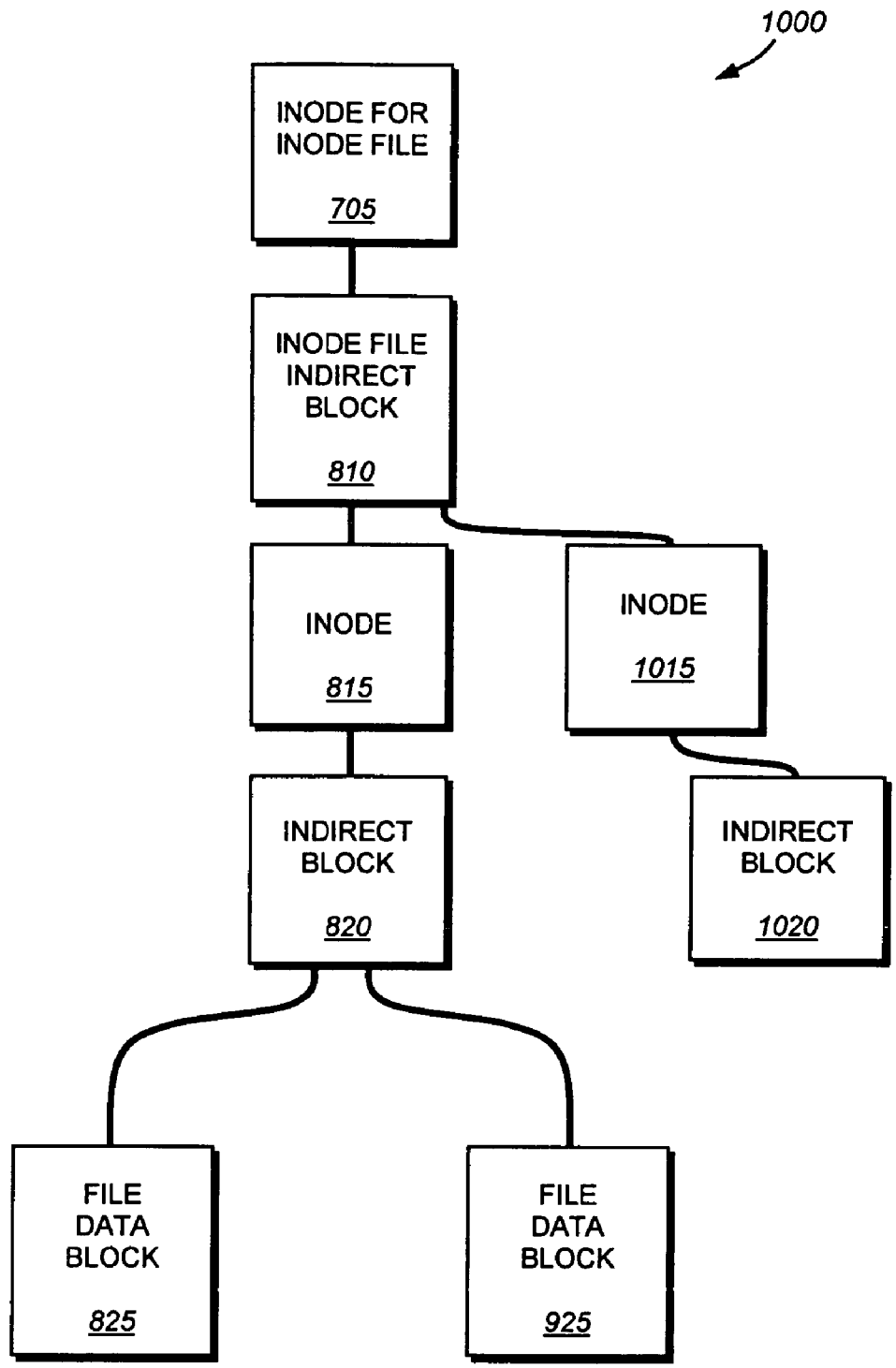
FIG. 10 is a schematic block diagram of an exemplary filled in file in accordance with an embodiment of the present invention.

FIG. 8 is a schematic block diagram of an exemplary inode structure 800 of a partially filled sparse file. The sparse file includes the original inode for the inode file 705. However, the inode file indirect block 810, inode 815, indirect block 820 and exemplary file data block 825 have been filled in as write operations have occurred to the file. Continued write operations will result in filling additional file data blocks, for example, file data block 925 as shown in the exemplary inode structure 900 of FIG. 9. Eventually, when the file has been completely filled, all blocks, including such blocks as inode 1015, indirect block 1020 and associated file data blocks (not shown) in the schematic block diagram of an exemplary inode structure 1000 in FIG. 10 will be completed. At such point, the sparse file has been completely filled in and each block is associated with an actual block on disk.

D. Space Reservations

The present invention is directed to a system and method for reserving space to guarantee file writeability in a file system supporting PCPIs. According to the invention, an administrator is permitted to set a fractional reserve percentage for an overwrite block reserve, is the theoretical amount of space required to completely overwrite each block stored in a PCPI, i.e. to have complete divergence between the active file system and a PCPI. A fractional reserve percentage value is set depending on the average rate of change of data in a given volume, thereby enabling the administrator to utilize the inherently space efficient PCPIs without requiring reservation of twice the amount of storage actually used by the file system. In the illustrative embodiment, the administrator may configure the fractional reserve percentage value for each volume. The fractional reserve percentage value indicates the percentage of the overwrite block reserve that is reserved for overwriting PCPIs. The invention further provides a series of space accounting mechanisms, including the novel fractional reserve percentage value, to account for various contingencies, including the expected divergence of a file in the active system from a copy stored in a PCPI.

During normal storage system operations, the file system receives a write operation from a client. In response, the storage system first determines if the write operation is directed to a space reserved file, i.e., a file that has space reservation set. A space reserved file may be, e.g., a sparse file. If the write operation is directed to a space reserved file, the file system determines if the space needed for the write operation is less then the space available in the file system. If so, the write operation is permitted; however, if the space available is not sufficient for the write operation, the write operation fails. Moreover, if the write operation is not directed to a reserved file, the file system determines if the space required for the write operation is less then the space available minus the fractional reserve percentage multiplied by the overwrite reserve. If so, the file system processes the write operation.

The fractional reserve percentage is typically set by an administrator during provisioning of the storage system and is illustratively based on the rate of change of data in a volume between two PCPIs. Unlike previous systems, the novel fractional reserve percentage allows an administrator to provision the storage system with less than twice the amount of space desired.

Figure 11:
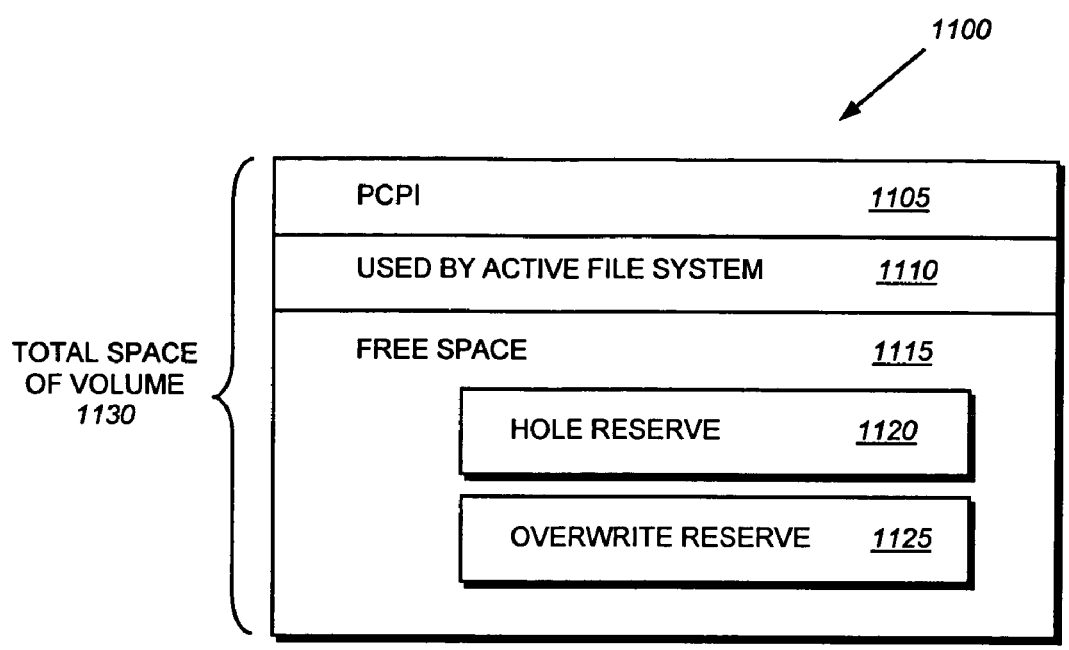
FIG. 11 is a schematic block diagram of an exemplary space reservation use table of the total space available in a volume.

FIG. 11 is a schematic block diagram illustrating a manner in which the total space of a volume 1130 may be allocated in accordance with an embodiment of the present invention. The total space of the volume 1130 is divided into three sections including, for example, space used by PCPIs 1105, space used by the active file system 1110 and free space 1115. The area occupied by PCPIs 1105 includes the space occupied by blocks that are currently in a PCPI but are not also in the active file system. In other words, the PCPI space 1105 consists of those blocks that have been later modified in the active file system, which requires that a copy of the unmodified block be kept for purposes of PCPI restoration. The space used by the active file system 1110 comprises disk blocks that are currently storing data of files accessible within the active file system (but not including PCPIs or other system configuration information). The free space 1115 comprises disk blocks that are unallocated to any of the other categories. The free space 1115 may be utilized to store data of new write operations, the creation of new files, or may be utilized in the generation of a PCPI. Included within the free space 1115 are a hole reserve 1120 and an overwrite reserve 1125. The hole reserve 1120 comprises storage space used to fill in sparse files. The overwrite reserve 1125 is used for blocks that are identical in both the active file system and in one or more PCPIs. When one of these blocks is overwritten in the active file system, a new block must be allocated as the original block remains allocated in the PCPI.

Figure 12:
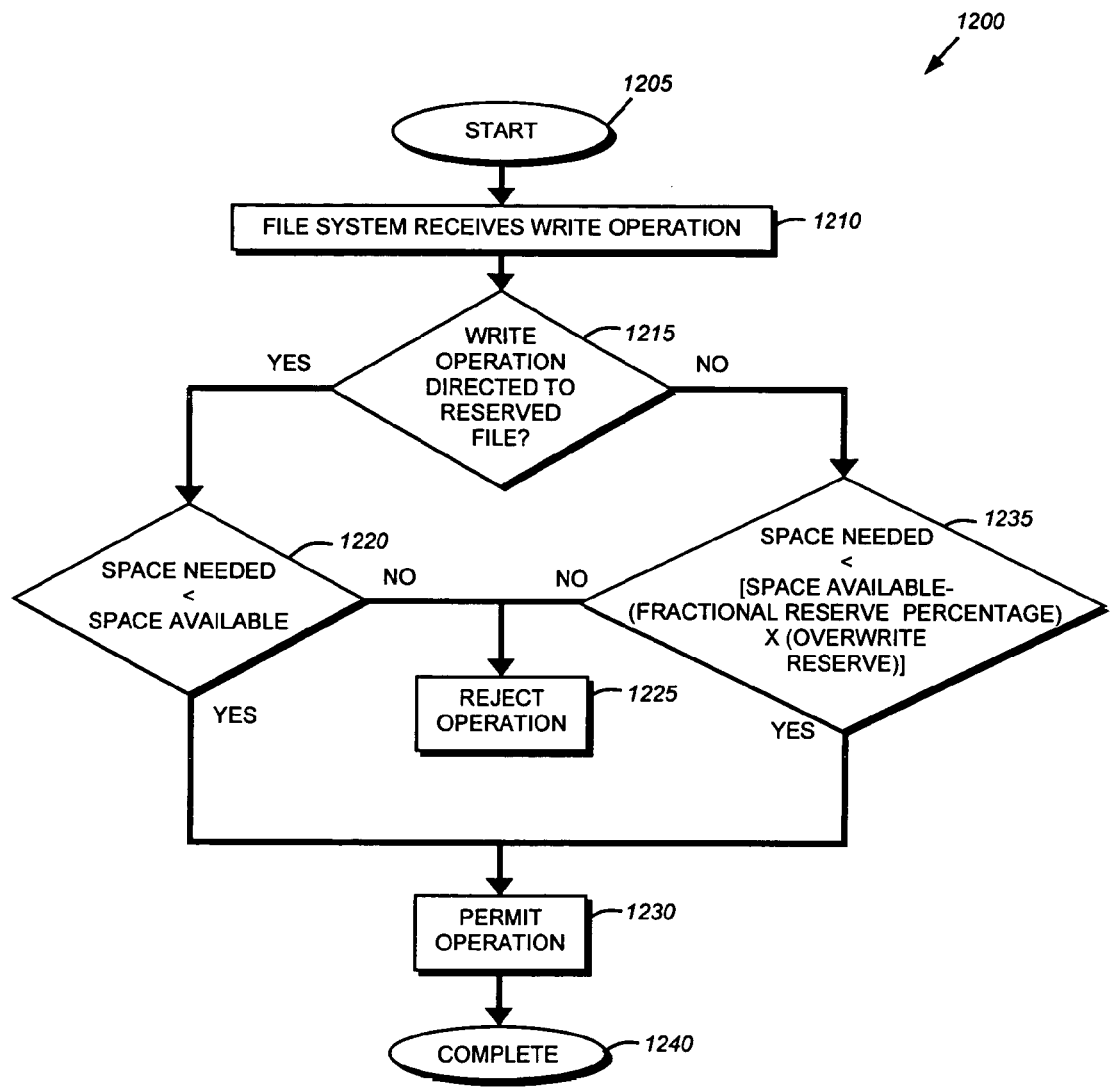
FIG. 12 is a flowchart detailing the steps of a procedure for implementing a space reservation policy in accordance with an embodiment of the present invention.

FIG. 12 is a flowchart detailing the steps of a procedure 1200 for implementing space reservations in accordance with an embodiment of the present invention. The procedure 1200 begins in step 1205 and continues to step 1210 where the file system of the storage system receives a write operation either from a client or as a result of intra-storage system processing. In step 1215, the file system determines if the write operation is directed to a space reserved file, i.e., to a file that has space reservations activated. If so, the file system, in step 1220, determines whether the space needed for the write operation is less than the space available in the volume, i.e., whether the space required for the write operation is less than the free space 1115 of the volume. If the space needed is not less than the space available, the procedure branches to step 1225 where the file system rejects the write operation. Otherwise, the operation is permitted in step 1230. Thus, in the illustrative embodiment, a write operation directed to a reserved file will only fail if the total free space is insufficient. Write operations are allowed even if the free space would fall below the overwrite reserve.

If, in step 1215, the file system determines that the write operation is not directed to a reserved file, the file system then, in step 1235, determines if the space needed for the write operation is less than the space available minus the fractional reserve percentage multiplied by the overwrite reserve value, i.e.:

Space Needed<[Space Available−(Fractional Reserve Percentage)(Overwrite Reserve)]

In performing this calculation, the space reservation process 667 determines the space available in the volume by determining the free space 1115 of the volume. A percentage of the overwrite reserve is subtracted from this free space (i.e., the space available) to determine whether there is sufficient space to perform the write operation and to maintain the appropriate reserve. As noted above, the fractional reserve percentage is selected based on the average rate of change in the volume between generation of PCPIs. This differs from previous space reservation techniques, where the free space would need to be sufficiently large to accommodate the write operation and the entire overwrite reserve value. If the space needed is not less than this computed value, the procedure branches to step 1225. Where the file system rejects the operation. Otherwise, the operation is permitted in step 1230 and the procedure ends at step 1240.

Illustratively, an administrator provisions the storage system and sets the novel fractional reserve percentage based on the amount of overwrite protection desired. For example, if the rate of change of data is 10% per day and the administrator does not want to run out of space for two days after generating PCPIs, the fractional reserve percentage is set to 20% (10%×2).

To again summarize, the present invention provides a system and method for guaranteeing file writeability in a file system supporting PCPIs by utilizing space reservations. The file system tracks and allocates the amount of free space available. In response to receiving certain commands that could reduce the amount of free space, e.g., a write operation, the file system determines if the requested operation reduces the free space below a predetermined threshold level. First, the file system determines if the write operation is directed to a reserved file, i.e., a file that has space reservation active. If so, the file system determines if the space needed to complete the operation is less than the space available. If the space needed is less than the space available, the file system permits the write operation to be performed. Otherwise, the write operation is not permitted. If the write operation is not for a reserved file, the file system then determines if the space needed to perform the requested write operation is less than the space available minus the overwrite reserved multiplied by the administrator-selected fractional reserve percentage. If the storage space needed is less than this computed amount, the write operation is permitted to proceed. Otherwise, the write operation fails.

It should be noted that, while the illustrative embodiment is described in terms of files, the teachings of the present invention may be utilized with any suitable data container. As used herein, the term data container generally refers to a unit of storage for holding data, such as a file system, disk file, volume or a logical number (lun), which is addressable by, e.g., its own unique identification. It should also be noted that, while the illustrative embodiment is written in terms of PCPIs, the teachings of the present invention may be used to ensure file writeability in any file system that shares blocks among multiple instances of the same file.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method, comprising:
setting a fractional reserve percentage for an overwrite reserve space of a data container operatively connected to a storage system to a rate of change of data between generation of persistent consistency point images (PCPIs);
receiving a write operation at the storage system and determining by a processor of the storage system whether the write operation is directed to a non-reserved data object, the write operation requiring a first amount of space for storage in the data container, the data container comprising an amount of free space;
in response to determining that the write operation is directed to the non-reserved data object, determining by the processor whether the data container has sufficient space for the storage system to perform the write operation if the first amount of space required for storage in the data container is less than the amount of free space minus the fractional reserve percentage multiplied by an amount of the overwrite reserve space; and
in response to determining that the data container has sufficient space, performing the write operation.

2. The method of claim 1 wherein the non-reserved data object comprises a non-reserved file.

3. The method of claim 1 further comprising:
in response to determining that the data container has insufficient space, rejecting the write operation.

4. The method of claim 1 further comprising:
in response to determining that the write operation is directed to a reserved data object, determining whether the data container has sufficient space for the storage system to perform the write operation;
in response to determining that the data container has sufficient space, performing the write operation; and
in response to determining that the data container has insufficient space, rejecting the write operation.

5. The method of claim 1 further comprising:
provisioning the storage system with less than twice the amount of free space.

6. The method of claim 1 wherein the non-reserved data object comprises a persistent consistency point image of the data container.

7. The method of claim 1 wherein the amount of overwrite reserve comprises a size required to overwrite each block stored in a persistent consistency point image of the non-reserved data object.

8. A non-transitory computer-readable medium containing executable program instructions for execution by a processor, comprising:
program instructions that set a fractional reserve percentage for an overwrite reserve space of a data container operatively connected to a storage system to a rate of change of data between generation of persistent consistency point images (PCPIs);
program instructions that receive a write operation at the storage system and determining by a processor of the storage system whether the write operation is directed to a non-reserved data object, the write operation requiring a first amount of space for storage in the data container, the data container comprising an amount of free space;
program instructions that determine, in response to determining that the write operation is directed to the non-reserved data object, whether the data container has sufficient space for the storage system to perform the write operation if the first amount of space required for storage in the data container is less than the amount of free space minus the fractional reserve percentage multiplied by an amount of the overwrite reserve space; and
program instructions that, in response to determining that the data container has sufficient space, perform the write operation.

9. The non-transitory computer-readable medium of claim 8 wherein the non-reserved data object comprises a non-reserved file.

10. The non-transitory computer readable medium of claim 8 further comprising:
program instructions that, in response to a determination that the data container has insufficient space, reject the write operation;
program instructions that, in response to determining that the write operating is directed to a reserved data object, determine whether the data container has sufficient space for the storage system to perform the write operation;

program instructions that, in response to determining that the data container to has sufficient space, perform the write operation; and program instructions that, in response to determining that the data container has insufficient space, reject the write operation.

11. The non-transitory computer readable medium of claim 8 further comprising:

program instructions that determine, in response to determining that the write operation is directed to a reserved data object, whether the data container has sufficient space for the storage system to perform the write operation;

program instructions that perform, in response to determining that the data container has sufficient space, the write operation; and program instructions that reject, in response to determining that the data container has insufficient space, the write operation.

12. The non-transitory computer readable medium of claim 8 wherein the rate of change of data between generation of PCPIs is multiplied by a number of PCPIs to be retained on the data container.

13. The non-transitory computer readable medium of claim 8 further comprising:

program instructions that, in response to determining that the data container has insufficient space, reject the write operation.

14. A storage system, comprising:

a processor configured to execute a storage operating system of the storage system;

an adaptor configured to receive a write operation; and a memory configured to store the storage operating system, the storage operating system when executed operable to:

determine whether the write operation is directed to a non-reserved data object, wherein the write operation requires a first amount of space for storage in a data container operatively connected to the storage system, the data container comprising an amount of free space and an overwrite reserve space;

determine, in response to determining that the write operation is directed to the non-reserved data object, whether the data container has sufficient space for the storage system to perform the write operation if the first amount of space required for storage in the data container is less than the amount of free space minus a fractional reserve percentage of the overwrite reserve multiplied by an amount of the overwrite reserve space, wherein the fractional reserve percentage is a rate of change of data between generation of persistent consistency point images (PCPIs), and perform, in response to determining that the data container has sufficient space, the write operation, and reject, in response to determining that the data container has insufficient space, the write operation.

15. The storage system of claim 14 wherein the non-reserved data object comprises a non-reserved file.

16. The storage system of claim 14 wherein the storage operating system when executed is further operable to provision the storage system with less than twice the amount of free space.

17. The storage system of claim 14 wherein the storage operating system when executed is further operable to:

determine, in response to determining that the write operation is directed to a reserved data object, whether the data container has sufficient space for the storage system to perform the write operation;

perform, in response to determining that the data container has sufficient space, the write operation; and reject, in response to determining that the data container has insufficient space, the write operation.

18. The storage system of claim 14 wherein the amount of overwrite reserve comprises a size required to overwrite each block stored in a persistent consistency point image of the non-reserved data object.

19. The method of claim 1 wherein the rate of change of data between generation of PCPIs is multiplied by a number of PCPIs to be retained on the data container.

20. The storage system of claim 14 wherein the rate of data change between generation of PCPIs is multiplied by a number of PCPIs to be retained on the data container.

* * * * *

UNITED STATES PATENT AND TRADEMARK OFFICE
CERTIFICATE OF CORRECTION

PATENT NO.         : 8,266,191 B1
APPLICATION NO.    : 12/123833
DATED              : September 11, 2012
INVENTOR(S)        : Aggarwal et al.

Page 1 of 1

It is certified that error appears in the above-identified patent and that said Letters Patent is hereby corrected as shown below:

In the Specifications:
In col. 1, line 28 should read:
area network (SAN) ~~is~~ or a network attached storage (NAS)

Figure 1:
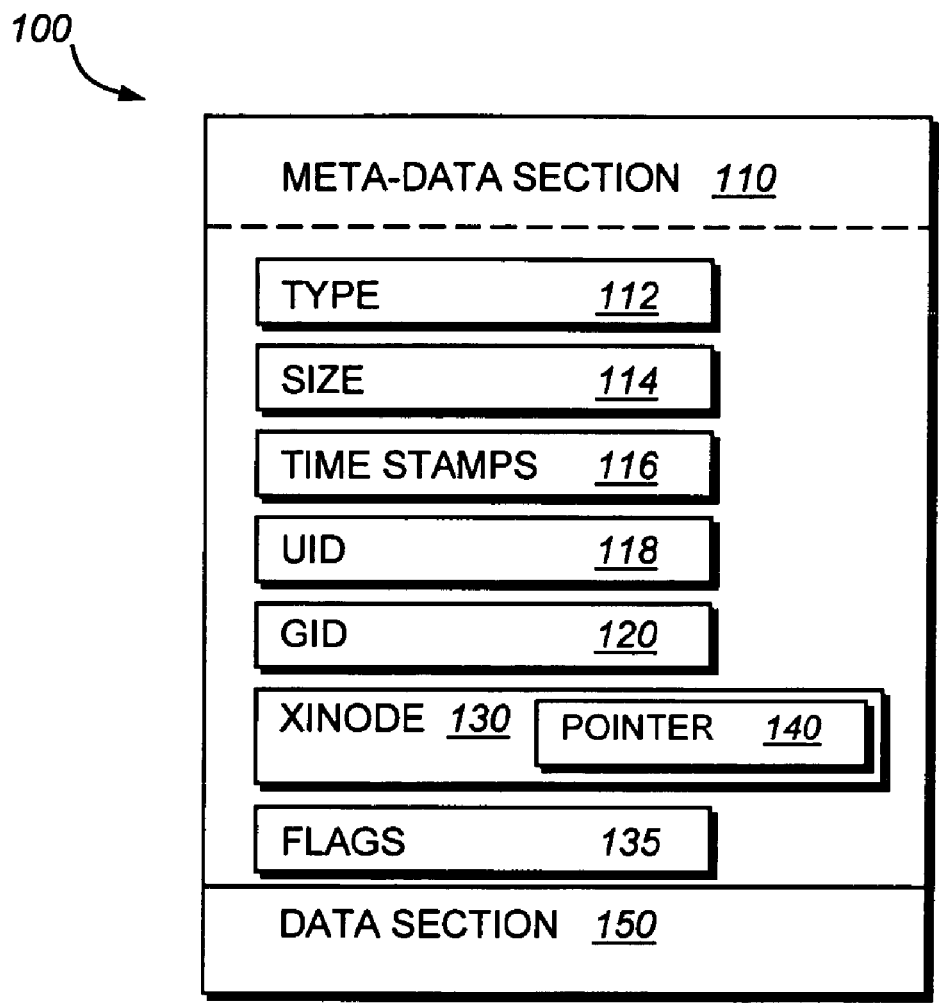
FIG. 1, already described, is a schematic block diagram of an exemplary inode data structure in accordance with an embodiment of the present invention.
Figure 2:
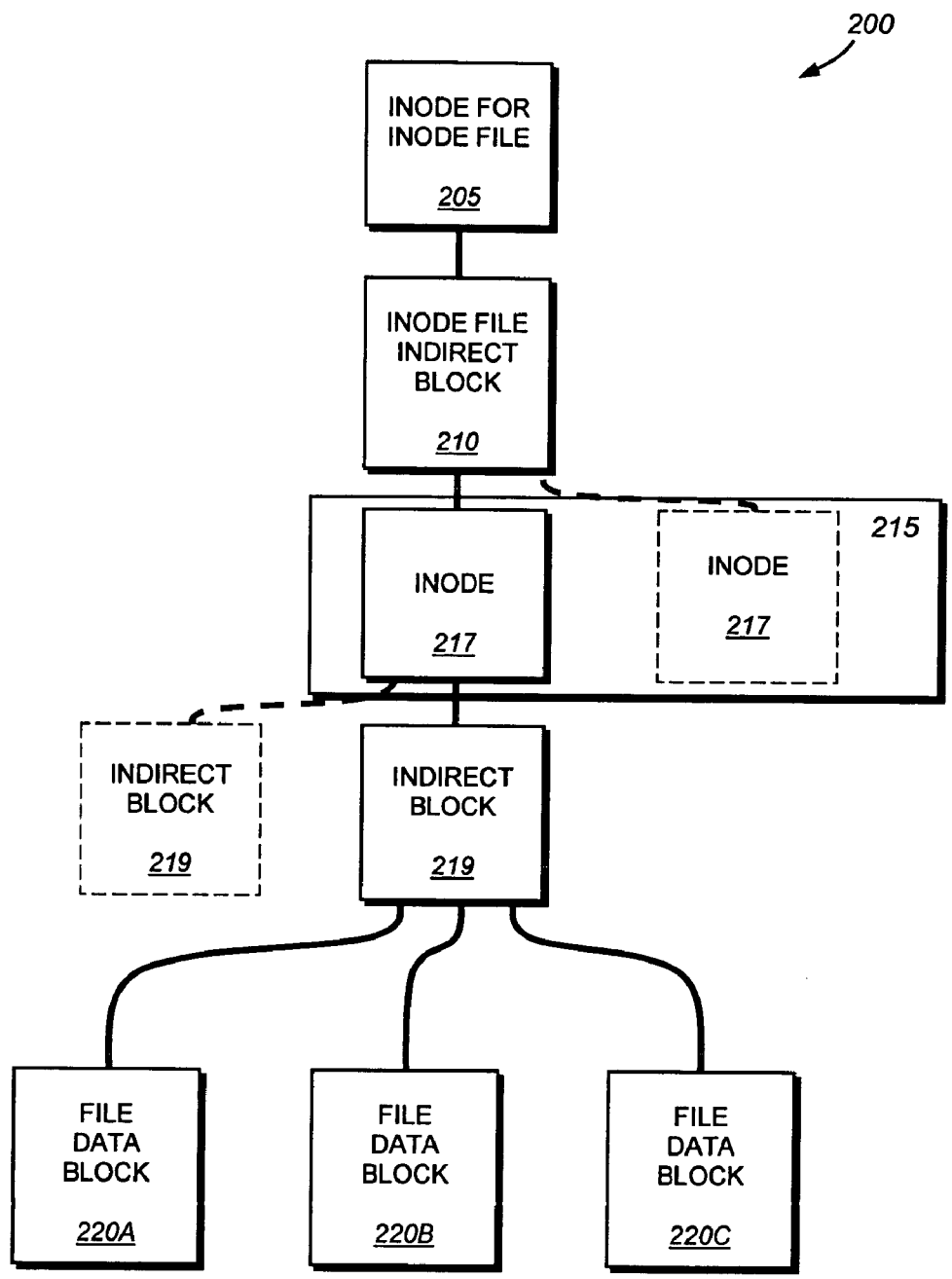
FIG. 2, already described, is a schematic block diagram of an exemplary inode data structure in accordance with an embodiment of the present invention.
Figure 3:
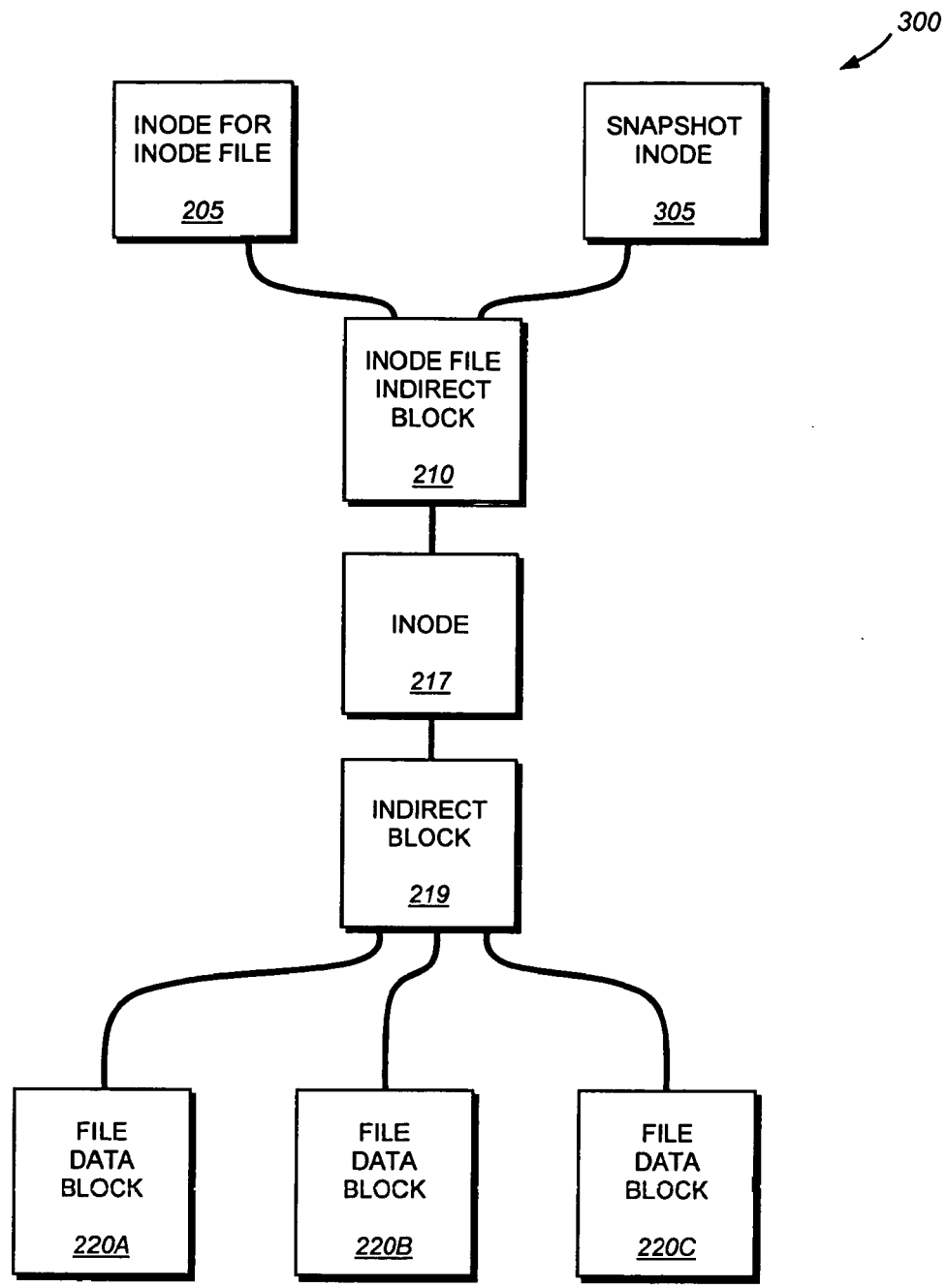
FIG. 3, already described, is a schematic block diagram of an exemplary inode data structure showing a PCPI root inode in accordance with an embodiment of the present invention.
Figure 4:
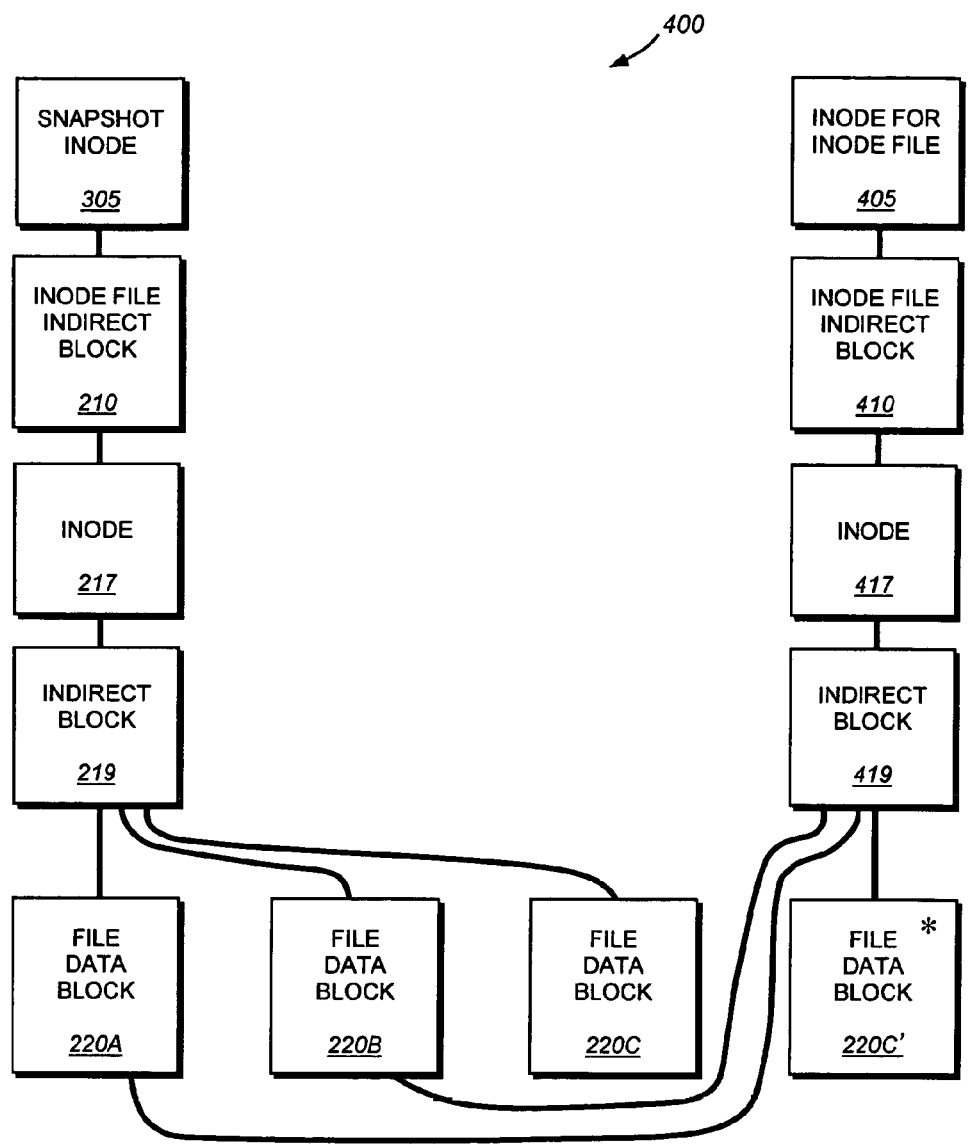
FIG. 4, already described, is a schematic block diagram of an exemplary inode data structure showing a modified file after a PCPI.

In col. 2, line 36 should read:
File Layout (WAFL™) ~~is~~ file system, by Network Appliance, In col. 3, line 39 should read:
the storage operating system. An exemplary file system ~~mode~~ inode In col. 3, line 40 should read:
structure 200 is shown in FIG. 2. The ~~mode~~ inode for an ~~mode~~ inode file In col. 5, line 1 should read:
re-writing data that is stored both in the active file ~~is~~ system In col. 5, line 39 should read:
OFSPACE error. As clients are typically not programmed to ~~is~~

In col. 6, line 14 should read:
fractional reserve percentage value indicates the ~~is~~ percentage In col. 7, line 32 should read:
ance 500 configured to ~~is~~ provide storage service relating to In the Claims:
In col. 17, line 2 should read:
the data container ~~to~~ has sufficient space, perform the Signed and Sealed this
Thirteenth Day of August, 2013

Teresa Stanek Rea
*Acting Director of the United States Patent and Trademark Office*